United States Patent
Lee et al.

(10) Patent No.: US 11,718,691 B2
(45) Date of Patent: Aug. 8, 2023

(54) MODIFIED POLYISOBUTYLENE POLYMER FOR RUBBER COMPOUNDING AND RUBBER COMPOSITION COMPRISING SAME

(71) Applicant: DL Chemical CO., LTD., Seoul (KR)

(72) Inventors: Se Hyun Lee, Daejeon (KR); Kyong Ju Na, Gwangju (KR); Min Sup Park, Daejeon (KR); Myeong Seok Kim, Sejong-si (KR)

(73) Assignee: DL Chemical CO., LTD., Seoul (KR)

( * ) Notice: Subject to any disclaimer, the term of this patent is extended or adjusted under 35 U.S.C. 154(b) by 248 days.

(21) Appl. No.: 16/988,844

(22) Filed: Aug. 10, 2020

(65) Prior Publication Data
US 2021/0054116 A1     Feb. 25, 2021

(30) Foreign Application Priority Data

Aug. 21, 2019  (KR) .................. 10-2019-0102594
Jul. 3, 2020    (KR) .................. 10-2020-0081910

(51) Int. Cl.
| | |
|---|---|
| *C08L 9/06* | (2006.01) |
| *C08L 9/00* | (2006.01) |
| *C08F 8/42* | (2006.01) |
| *C08F 8/46* | (2006.01) |
| *C08F 136/08* | (2006.01) |

(52) U.S. Cl.
CPC ............ *C08F 136/08* (2013.01); *C08F 8/42* (2013.01); *C08F 8/46* (2013.01); *C08L 9/06* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 5,137,978 | A * | 8/1992 | Degonia ............... | C07C 51/567 525/386 |
| 5,430,086 | A * | 7/1995 | Saito ..................... | B60C 1/0016 524/495 |
| 6,372,855 | B1 | 4/2002 | Chino et al. | |
| 7,700,673 | B2 | 4/2010 | Wang et al. | |
| 8,637,606 | B2 | 1/2014 | Pille-Wolf et al. | |
| 2004/0018312 | A1 | 1/2004 | Halladay | |
| 2004/0171759 | A1 | 9/2004 | Lange et al. | |
| 2005/0215693 | A1 * | 9/2005 | Wang ..................... | C08C 19/28 524/445 |
| 2008/0223494 | A1 * | 9/2008 | Amino ................... | C08L 9/06 152/209.1 |

FOREIGN PATENT DOCUMENTS

| | | |
|---|---|---|
| EP | 0 210 019 A2 | 1/1987 |
| EP | 2 638 118 B1 | 12/2017 |
| JP | 0639506 B2 | 5/1994 |
| JP | 2000-169523 A | 6/2000 |
| JP | 2001-48929 A | 2/2001 |
| JP | 2013-203724 A | 10/2013 |
| KR | 10-1985-0000113 A | 2/1985 |
| KR | 10-2007-0096748 A | 10/2007 |
| KR | 10-0882542 B1 | 2/2009 |
| KR | 10-2011-0072253 A | 6/2011 |
| KR | 10-2013-0109842 A | 10/2013 |
| KR | 10-2015-0024701 A | 3/2015 |
| KR | 10-2016-0002044 A | 1/2016 |
| WO | 2018/191185 A1 | 10/2018 |
| WO | 2018/191185 A8 | 10/2018 |

OTHER PUBLICATIONS

Chevron Oronite data sheet for OLOA 15500 (2007). (Year: 2007).*
Written Decision on Registration dated May 2, 2022 in Korean Application 10-2020-0081910. (Year: 2022).*
The Extended European Search Report dated Jan. 29, 2021, issued by the European Patent Office in application No. 20189811.1.
Search Report dated Feb. 10, 2021, issued by the Intellectual Property Office of Singapore in application No. 10202007460W.
Communication dated Mar. 10, 2021, issued by the Intellectual Property Office of Singapore in application No. 10202007460W.
Communication dated Jul. 13, 2021, issued by the Japanese Patent Office in application No. 2020-136862.

* cited by examiner

*Primary Examiner* — David J Buttner
(74) *Attorney, Agent, or Firm* — Sughrue Mion, PLLC

(57) ABSTRACT

The present invention relates to a modified polyisobutylene polymer for rubber compounding including polyisobutylene having isobutylene as a main chain, unsaturated dicarboxylic anhydride, and a silane compound, and more particularly, 20 to 80 wt % of polyisobutylene having isobutylene as a main chain, 1 to 20 wt % of unsaturated dicarboxylic anhydride, and 1 to 60 wt % of a silane compound. In particular, when the polyisobutylene polymer of the present invention is used as an additive for rubber, the dispersibility of a filler can be significantly increased and both grip performance and rolling resistance can be improved.

16 Claims, No Drawings

MODIFIED POLYISOBUTYLENE POLYMER FOR RUBBER COMPOUNDING AND RUBBER COMPOSITION COMPRISING SAME

CROSS-REFERENCE TO RELATED APPLICATIONS

This application is based on and claims priority from Korean Patent Application No. 10-2019-0102594, filed on Aug. 21, 2019 and Korean Patent Application No. 10-2020-0081910, filed on Jul. 3, 2020 with the Korean Intellectual Property Office, the disclosures of which are incorporated herein in their entirety by reference.

BACKGROUND OF THE INVENTION

1. Technical Field

The present invention relates to a modified polyisobutylene polymer for rubber compounding and a rubber composition including the same.

2. Description of the Related Art

Polyisobutylene (polybutene) is a polymer obtained by polymerizing an olefin component having 4 carbon atoms (C4) obtained in a naphtha-cracking process using a Friedel-Craft-type catalyst, and the number average molecular weight (Mn) thereof is about 300 to 10,000.

What remains after extracting 1,3-butadiene from C4 feedstock is called C4 raffinate-1, and includes paraffins such as isobutane, normal butane, etc., and olefins such as 1-butene, 2-butene, isobutene, etc. Here, the amount of isobutene is about 30 to 50 wt %. The C4 raffinate-1 is mainly used for the preparation of methyl t-butylether (MTBE) or polyisobutylene (polybutene), serving as an octane number improver. Since the reactivity of isobutene is the highest among the olefin components of C4 raffinate-1, the resulting polyisobutylene (polybutene) is mainly composed of isobutene units. Polyisobutylene (polybutene) increases in viscosity with increased molecular weight thereof, and has a viscosity of about 4 to 40000 cSt (centistokes) at 100° C.

Korean Patent Application Publication No. 10-2011-0072253 discloses a method of improving the grip performance of a tire tread using polyisobutylene (polybutene) having high reactivity. Also, Korean Patent Application Publication No. 10-2007-0096748 discloses a method of improving wear performance, fuel efficiency and braking performance using carboxylated liquid isoprene rubber. As such, efforts are being made to increase fuel efficiency and braking performance of rubber, specifically when applied to tire treads.

With regard to improving grip force, Korean Patent Application Publication No. 10-2016-0002044 discloses a composition exhibiting superior grip performance and wear resistance under high-speed conditions due to the use of a masterbatch in which pellet-type plant resins such as sesame resin, sunflower resin, coconut resin and the like are added to styrene butadiene rubber. As already mentioned, the grip force is a technique in which the surface of a tire is brought into close contact with the road surface, and it is advantageous for the tire to have superior elasticity if possible. However, when considering both grip force and rolling resistance, rolling resistance advantageously decreases with a decrease in closeness of contact with the road surface, so there is a tradeoff between rolling resistance and the grip force of the tire. Specifically, a tire having low rolling resistance is advantageous in terms of fuel efficiency, but may have poor contact with a road when the road is wet. Accordingly, recent tire development is progressing in a way to control both at the same time, rather than a one-dimensional method of increasing the rolling resistance or increasing the grip force.

For example, Korean Patent Application Publication No. 10-2015-0024701 and U.S. Pat. No. 8,637,606 disclose the use of silica and a modified terpene phenol resin having a high softening point, in which the phenol increases compatibility with synthetic rubber to thus reduce the fluidity of the resin, thereby improving grip performance on wet surfaces without deteriorating rolling resistance. Also, Korean Patent No. 10-1591276 discloses a rubber composition including 20 to 50 parts by weight of epoxidized natural rubber having a Tg of −50 to −40° C., a Mooney viscosity of 60 to 80, and an epoxidation degree of 5 to 50%, thereby improving the braking power of tires on the wet road surface, and uniformly improving low rolling resistance or fuel efficiency and durability without deteriorating wear resistance. Despite a variety of such attempts, there is a need for a technique that has satisfactory numerical values of both rolling resistance and grip force of tires.

CITATION LIST

Patent Literature

Korean Patent Application Publication No. 10-2011-0072253
Korean Patent Application Publication No. 10-2007-0096748
Korean Patent Application Publication No. 10-2016-0002044
Korean Patent Application Publication No. 10-2015-0024701
U.S. Pat. No. 8,637,606

SUMMARY OF THE INVENTION

An objective of the present invention is to provide a modified polyisobutylene polymer for rubber compounding, which enables the preparation of a rubber composition capable of exhibiting superior grip performance and rolling resistance as well as high dispersibility when mixed with a filler.

The present invention provides a modified polyisobutylene polymer for rubber compounding, prepared by mixing polyisobutylene having isobutylene as a main chain, unsaturated dicarboxylic anhydride, and a silane compound.

More specifically, the modified polyisobutylene polymer for rubber compounding may be prepared by mixing 20 to 80 wt % of polyisobutylene having isobutylene as a main chain, 1 to 20 wt % of unsaturated dicarboxylic anhydride, and 1 to 60 wt % of a silane compound.

In the modified polyisobutylene polymer for rubber compounding according to an embodiment of the present invention, the polyisobutylene having isobutylene as the main chain may have a number average molecular weight of 350 g/mol to 6,000 g/mol.

In the modified polyisobutylene polymer for rubber compounding according to an embodiment of the present invention, the polyisobutylene having isobutylene as the main chain may have a polydispersity of 1 to 5.

In the modified polyisobutylene polymer for rubber compounding according to an embodiment of the present invention, the unsaturated dicarboxylic anhydride may be at least one selected from among maleic anhydride, itaconic anhydride, citraconic anhydride, propenyl succinic anhydride and 2-pentendioic anhydride.

In the modified polyisobutylene polymer for rubber compounding according to an embodiment of the present invention, the silane compound may contain an amino group.

In the modified polyisobutylene polymer for rubber compounding according to an embodiment of the present invention, the silane compound may be represented by Chemical Formula 1 below.

[Chemical Formula 1]

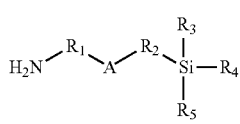

In Chemical Formula 1, $R_1$ and $R_2$ are each independently selected from among (C1-C5) alkylene, (C1-C5) aminoalkylene, carbonylene and (C1-C5) alkyl carbonylene, and are identical to or different from each other;

$R_3$, $R_4$ and $R_5$ are each independently selected from among hydrogen, hydroxy, (C1-C20) alkyl, (C1-C12) cycloalkyl, (C2-C14) acyloxy, (C4-C20) aryloxy, (C5-C30) araloxy, (C1-C20) amine and (C1-C12) alkoxy, and are identical to or different from each other; and A is methylene, $S_n$ or $((R_6)NR_7)_n$, in which $R_6$ is hydrogen or (C1-C5) alkyl, $R_7$ is (C1-C5) alkylene, and n is an integer of 1 to 10.

In the modified polyisobutylene polymer for rubber compounding according to an embodiment of the present invention, the silane compound may be at least one selected from among 3-aminopropyl triethoxysilane, 3-aminopropyl trimethoxysilane, N-(2-aminoethyl)-3-aminopropyl triethoxysilane, 3-aminopropyl methyldiethoxysilane, 3-aminopropyl silanetriol, 3-aminopropyl methyldimethoxysilane, 3-(2-aminoethylamino)propyl dimethoxymethylsilane, 3-(2-aminoethylamino)propyl trimethoxysilane, 2-ethanediamine N-(2-aminoethyl)-N'-[3-(trimethoxysilyl)propyl]-1, 1-[3-(trimethoxysilyl)propyl]urea and 1-[3-(triethoxysilyl)propyl]urea.

The modified polyisobutylene polymer for rubber compounding according to an embodiment of the present invention may contain nitrogen.

The modified polyisobutylene polymer for rubber compounding according to an embodiment of the present invention may contain a carbonyl group.

The modified polyisobutylene polymer for rubber compounding according to an embodiment of the present invention may contain an amide group.

The modified polyisobutylene polymer for rubber compounding according to an embodiment of the present invention may have a Si content of 0.05 to 10 mass % based on X-ray fluorescence analysis.

The modified polyisobutylene polymer for rubber compounding according to an embodiment of the present invention may have a glass transition temperature of −50° C. or less.

The modified polyisobutylene polymer for rubber compounding according to an embodiment of the present invention may have a Brookfield viscosity at 150° C. of 5 to 10,000 cP.

The modified polyisobutylene polymer for rubber compounding according to an embodiment of the present invention may have a number average molecular weight of 580 to 10,000 g/mol and a polydispersity of 1 to 5.

In addition, the present invention provides a rubber composition. The rubber composition according to the present invention includes the modified polyisobutylene polymer for rubber compounding according to an embodiment of the present invention, a rubber base, and a filler.

In the rubber composition according to an embodiment of the present invention, the filler may include at least one selected from among silica and carbon black.

In the rubber composition according to an embodiment of the present invention, the rubber base may include at least one selected from among butadiene rubber, butyl rubber, emulsion-polymerized styrene butadiene rubber (E-SBR), solution-polymerized styrene butadiene rubber (S-SBR), epichlorohydrin rubber, nitrile rubber, hydrogenated nitrile rubber, brominated polyisobutyl isoprene-co-paramethyl styrene (BIMS) rubber, urethane rubber, fluorine rubber, silicone rubber, styrene-ethylene-butadiene-styrene copolymer rubber, ethylene propylene rubber, ethylene-propylene-diene monomer rubber, Hypalon rubber, chloroprene rubber, ethylene vinyl acetate rubber and acrylic rubber.

The rubber composition according to an embodiment of the present invention may include, based on 100 parts by weight of the rubber base, 50 to 150 parts by weight of silica, 5 to 20 parts by weight of carbon black, 2 to 40 parts by weight of the modified polyisobutylene polymer, and 2 to 15 parts by weight of a silane-coupling agent.

In addition, the present invention provides a tire tread, and the tire tread of the present invention may include the rubber composition according to an embodiment of the present invention.

According to the present invention, a modified polyisobutylene polymer for rubber compounding is prepared by mixing polyisobutylene having isobutylene as a main chain, unsaturated dicarboxylic anhydride, and a silane compound, and upon application thereof to a rubber composition, the dispersibility of a filler can be increased, and both braking performance and rolling resistance can be improved, thereby exhibiting high grip performance and low rolling resistance.

DESCRIPTION OF SPECIFIC EMBODIMENTS

The advantages and features of embodiments of the present invention and methods of achieving the same will be clarified with reference to examples described below in detail. However, the present invention is not limited to these embodiments, but may be modified in other forms. These embodiments are provided in order to fully convey the spirit of the present invention to those skilled in the art so that the contents introduced herein are thorough and complete, and the present invention is only defined by the scope of the claims. The same reference numerals refer to the same components throughout the specification.

In describing embodiments of the present invention, when it is determined that a detailed description of a known function or configuration may unnecessarily obscure the gist of the present invention, such a detailed description will be omitted. Moreover, terms to be described later are terms defined in consideration of functions in embodiments of the present invention, and may vary depending on a user's or operator's intention or practice. Therefore, the definition should be made based on the contents throughout this specification. For example, polyisobutylene may be referred to as polybutene.

According to the present invention, a modified polyisobutylene polymer for rubber compounding is prepared by mixing polyisobutylene having isobutylene as a main chain, unsaturated dicarboxylic anhydride, and a silane compound.

More specifically, the modified polyisobutylene polymer for rubber compounding according to the present invention may be prepared by mixing 20 to 80 wt % of polyisobutylene having isobutylene as a main chain, 1 to 20 wt % of unsaturated dicarboxylic anhydride, and 1 to 60 wt % of a silane compound. Based on the results of analysis with X-ray fluorescence (XRF), the modified polyisobutylene polymer thus prepared may have a Si content of 0.05 to 10 mass %, and preferably 0.5 to 5 mass %. When the modified polyisobutylene polymer is prepared by mixing individual components in amounts in the above ranges and is mixed with a rubber base and a filler to afford a rubber composition, the dispersibility of the filler in the rubber composition may be increased.

In an embodiment of the present invention, the modified polyisobutylene polymer may have a glass transition temperature of −50° C. or less, preferably −60 to −100° C., and more preferably −65 to −90° C. Also, the modified polyisobutylene polymer may have a viscosity of 5 to 10,000 cP, and preferably 50 to 5,000 cP, when measured using a Brookfield viscometer at 150° C. When the glass transition temperature and viscosity thereof fall in the above ranges, a storage modulus difference (ΔG') due to a Payne effect may be as low as 2.4 or less, and preferably 2.1 or less, upon subsequent mixing with the rubber base and the filler, indicating that the filler is uniformly dispersed. Here, ΔG' means $G'_{20\%}-G'_{0.02\%}$, which is a difference in storage modulus values measured at elongations of 0.02% and 20%.

In an embodiment of the present invention, the modified polyisobutylene polymer may have a number average molecular weight of 580 to 10,000 g/mol and a polydispersity of 1 to 5. When the modified polyisobutylene polymer satisfying the above molecular weight and polydispersity is mixed with the rubber base and the filler to afford a rubber composition, both grip performance and rolling resistance performance may be improved, and the rubber thus manufactured may have a dynamic loss coefficient at 0° C. of 0.25 or more and a dynamic loss coefficient at 60° C. of less than 0.094. More preferably, the modified polyisobutylene polymer has a number average molecular weight of 900 to 3,000 g/mol and a polydispersity of 1 to 3, and the manufactured rubber has a dynamic loss coefficient at 0° C. of 0.27 or more and a dynamic loss coefficient at 60° C. of 0.090 or less. Here, the dynamic loss coefficient at 0° C. may be an indicator of grip performance (wet grip), and the higher the dynamic loss coefficient at 0° C., the better the grip performance. The dynamic loss coefficient at 60° C. is an indicator of rolling resistance, and the lower the numerical value thereof, the better the rolling resistance. Specifically, according to the present invention, when the modified polyisobutylene polymer satisfying a number average molecular weight of 580 to 10,000 g/mol and a polydispersity of 1 to 5 is added to the rubber composition, both braking performance and rolling performance may be improved, thus increasing tire performance.

Meanwhile, in the preparation of the modified polyisobutylene polymer according to an embodiment of the present invention, the polyisobutylene having isobutylene as the main chain may have a number average molecular weight of 350 g/mol to 6,000 g/mol, and preferably 700 g/mol to 3,000 g/mol, and a polydispersity of 1 to 5, and preferably 1 to 3. The viscosity at 100° C. of polyisobutylene may be 2 cSt to 10,000 cSt, and preferably 100 cSt to 2,000 cSt.

In an embodiment of the present invention, the polyisobutylene may have a terminal vinylidene (α-vinylidene) content of 80 mol % or more, and preferably 85 mol % or more, based on $^{13}$C-NMR. If the α-vinylidene content is less than 80 mol %, the extent of improvement in both grip performance and rolling performance of rubber resulting from adding the prepared modified polyisobutylene polymer to the rubber composition may become insignificant. Here, the upper limit of the α-vinylidene content is not particularly limited, and may be, for example, 99 mol % or less, and particularly 95 mol % or less.

In an embodiment of the present invention, the silane compound may contain an amino group, and preferably, the silane compound in the modified polyisobutylene polymer according to an embodiment of the present invention may be a compound represented by Chemical Formula 1 below.

[Chemical Formula 1]

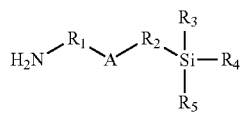

In Chemical Formula 1, $R_1$ and $R_2$ are each independently selected from among (C1-C5) alkylene, (C1-C5) aminoalkylene, carbonylene and (C1-C5) alkyl carbonylene, and are identical to or different from each other;

$R_3$, $R_4$ and $R_5$ are each independently selected from among hydrogen, hydroxy, (C1-C20) alkyl, (C1-C12) cycloalkyl, (C2-C14) acyloxy, (C4-C20) aryloxy, (C5-C30) araloxy, (C1-C20) amine and (C1-C12) alkoxy, and are identical to or different from each other; and A is methylene, $S_n$ or $((R_6)NR_7)_n$, in which $R_6$ is hydrogen or (C1-C5) alkyl, $R_7$ is (C1-C5) alkylene, and n is an integer of 1 to 10.

More preferably, $R_1$ and $R_2$ are each independently (C1-C3) alkylene, $R_3$, $R_4$ and $R_5$ are each independently hydrogen, hydroxy, (C1-C5) alkyl or (C1-C5) alkoxy, and A is methylene, $S_n$, or $((R_6)NR_7)_n$, in which $R_6$ is hydrogen or (C1-C5) alkyl, $R_7$ is (C2-C4) alkylene, and n is an integer of 2 to 5.

When the modified polyisobutylene polymer is prepared using a silane compound satisfying the above criteria, the dispersibility of the filler may be further increased.

Specifically, the silane compound may be at least one selected from among 3-aminopropyl triethoxysilane, 3-aminopropyl trimethoxysilane, N-(2-aminoethyl)-3-aminopropyl triethoxysilane, 3-aminopropyl methyldiethoxysilane, 3-aminopropyl silanetriol, 3-aminopropyl methyldimethoxysilane, 3-(2-aminoethylamino)propyl dimethoxymethylsilane, 3-(2-aminoethylamino)propyl trimethoxysilane, 2-ethanediamine N-(2-aminoethyl)-N'-[3-(trimethoxysilyl)propyl]-1, 1-[3-(trimethoxysilyl)propyl]urea and 1-[3-(triethoxysilyl)propyl]urea.

In the modified polyisobutylene polymer according to an embodiment of the present invention, the unsaturated dicarboxylic anhydride may be at least one selected from among maleic anhydride, itaconic anhydride, citraconic anhydride, propenyl succinic anhydride and 2-pentendioic anhydride.

Moreover, the modified polyisobutylene polymer prepared by mixing the polyisobutylene, the unsaturated dicarboxylic anhydride and the silane compound may contain nitrogen, and preferably a nitrogen atom joined through covalent bonding. Also, the modified polyisobutylene polymer may contain a carbonyl group, and preferably an imide group or an amide group. For example, the amide group may include a pyrrolidine-2,5-dione group.

In addition, the present invention pertains to a rubber composition.

According to the present invention, the rubber composition includes the modified polyisobutylene polymer according to an embodiment of the present invention, a rubber base, and a filler.

In an embodiment of the present invention, the rubber composition includes the modified polyisobutylene polymer, whereby the filler is uniformly dispersed therein, thus exhibiting superior grip performance and rolling resistance.

In the rubber composition according to an embodiment of the present invention, the rubber base may include at least one selected from among butadiene rubber, butyl rubber, emulsion-polymerized styrene butadiene rubber (E-SBR), solution-polymerized styrene butadiene rubber (S-SBR), epichlorohydrin rubber, nitrile rubber, hydrogenated nitrile rubber, brominated polyisobutyl isoprene-co-paramethyl styrene (BIMS) rubber, urethane rubber, fluorine rubber, silicone rubber, styrene-ethylene-butadiene-styrene copolymer rubber, ethylene propylene rubber, ethylene-propylene-diene monomer rubber, Hypalon rubber, chloroprene rubber, ethylene vinyl acetate rubber and acrylic rubber. Preferably, the rubber base includes at least one selected from among butadiene rubber, styrene butadiene rubber and butyl rubber.

More preferably, the rubber base includes styrene butadiene rubber, and the styrene butadiene rubber that is used may be one in which a styrene content is 9 to 19% and a vinyl group content in butadiene is 10 to 54%, a styrene content is 20 to 28% and a vinyl content in butadiene is 40 to 72%, or a styrene content is 30 to 42% and a vinyl content in butadiene is 20 to 70%.

In the rubber composition according to an embodiment of the present invention, the filler may be used without limitation, so long as it is a filler typically used in a rubber composition, preferably a rubber composition for tire treads, and the present invention is not limited thereto. As a specific and non-limiting example, the filler may include at least one selected from among silica and carbon black.

Here, the silica may be used without limitation, so long as it is silica particles used in rubber, preferably rubber for tire treads. Specifically, the silica may have a specific surface area (CTAB) of 80 $m^2/g$ to 300 $m^2/g$, preferably 110 $m^2/g$ to 220 $m^2/g$, more preferably 150 $m^2/g$ to 180 $m^2/g$, and most preferably 165 $m^2/g$. If the specific surface area thereof is less than the above lower limit, reinforcing properties may decrease and thus the strength thereof may be lowered. On the other hand, if the specific surface area thereof exceeds the above upper limit, the viscosity may increase upon rubber compounding, and dispersion may also be impeded.

Also, the carbon black may be used without limitation, so long as it is carbon black typically used in rubber for tire treads, and carbon black having a grade of 500 to 600 is preferably used. Specific and non-limiting examples thereof may include commercially available carbon black such as N110, N121, N134, N220, N231, N234, N242, N293, N299, S315, N326, N330, N332, N339, N343, N347, N351, N358, N375, N539, N550, N582, N630, N642, N650, N660, N683, N754, N762, N765, N774, N787, N907, N908, N990, N991, etc., and the present invention is not limited thereto.

Moreover, the rubber composition according to an embodiment of the present invention may further include a silane-coupling agent. Here, examples of the silane-coupling agent may include commercially available products such as Si-69 and the like, and known materials such as bis-(3-triethoxysilylpropyl)tetrasulfane (TESPT), bis-(3-ethoxysilylpropyl)disulfane (ESPD), N-[2-(vinylbenzylamino)-3-aminopropyltrimethoxysilane] and the like, and the present invention is not limited thereto.

The rubber composition according to an embodiment of the present invention may include, based on 100 parts by weight of the rubber base, 50 to 150 parts by weight of silica, 5 to 20 parts by weight of carbon black, 2 to 40 parts by weight of the modified polyisobutylene polymer, and 2 to 15 parts by weight of the silane-coupling agent, and preferably, based on 100 parts by weight of the rubber base, 60 to 120 parts by weight of silica, 7 to 15 parts by weight of carbon black, 5 to 20 parts by weight of the modified polyisobutylene polymer and 3 to 10 parts by weight of the silane-coupling agent.

The rubber composition according to an embodiment of the present invention may further include an additive typically used in rubber compositions. As a specific and non-limiting example, the rubber composition may further include an additive such as an antioxidant, an activator, a vulcanizing agent, a vulcanization accelerator, etc. The amount of each additive may vary depending on the type of additive, the end use of rubber to be manufactured, etc. As a specific and non-limiting example, based on 100 parts by weight of the rubber base, 0.5 to 5 parts by weight of each additive may be added, but the present invention is not limited thereto.

As a specific and non-limiting example, the vulcanizing agent that is used may be sulfur, morpholine disulfide, etc., and the vulcanization accelerator may include at least one selected from among sulfenamide-based, thiazole-based, thiuram-based, thiourea-based, guanidine-based, dithiocarbamic-acid-based, aldehyde-amine-based, aldehyde-ammonia-based, imidazoline-based and xanthate-based vulcanization accelerators.

Specifically, the sulfenamide-based vulcanization accelerator may include at least one sulfenamide-based compound selected from among CBS (N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenamide and N,N-diisopropyl-2-benzothiazolesulfenamide, the thiazole-based vulcanization accelerator may include at least one thiazole-based compound selected from among MBT (2-mercaptobenzothiazole), MBTS (dibenzothiazyl disulfide), 2-mercaptobenzothiazole sodium salt, zinc salt, copper salt, cyclohezylamine salt, 2-(2,4-dinitrophenyl)mercaptobenzothiazole and 2-(2,6-diethyl-4-morpholinothio)benzothiazole, the thiuram-based vulcanization accelerator may include at least one thiuram-based compound selected from among TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide and pentamethylenethiuram tetrasulfide, the thiourea-based vulcanization accelerator may include at least one thiourea-based compound selected from among thiocarbamide, diethylthiourea, dibutylthiourea, trimethylthiourea and di(ortho-tolyl)thiourea, and the guanidine-based vulcanization accelerator may include at least one guanidine-based compound selected from among diphenylguanidine, di(ortho-tolyl)guanidine, triphenylguanidine, ortho-tolyl biguanide and diphenylguanidine phthalate, but the present invention is not limited thereto.

In addition, the present invention pertains to a tire tread including the rubber composition according to an embodiment of the present invention. The tire tread according to the present invention has superior grip performance and rolling resistance, as described above, and thus has an advantage of exhibiting excellent fuel efficiency compared to other tire treads under the same conditions. Specifically, the tire tread may be a tire tread used for a passenger car, an SUV, a bus, a truck or an electric vehicle, but the present invention is not limited thereto.

A better understanding of the present invention will be given through the following examples and comparative examples. The following examples are merely set forth to illustrate the present invention, and are not to be construed as limiting the scope of the present invention.

[Preparation Example 1] Preparation of HRPB350 Modified Polyisobutylene Polymer

Polyisobutylene (Mn: 351 g/mol, PD=1.1, α-vinylidene: 80.6 mol % based on $^{13}$C-NMR, viscosity: 3 cSt at 100° C., 500 g, 1.42 mol) and maleic anhydride (172 g, 1.75 mol) were placed in a 1 L autoclave and allowed to react at 200° C. for 12 hr using a mechanical stirrer. In order to remove unreacted maleic anhydride, nitrogen bubbling was performed for 2 hr, thus obtaining polyisobutylene succinic anhydride [PIBSA-1]. The conversion rate thereof was determined to be 79.1% through column chromatography.

Then, the PIBSA-1 thus prepared (500 g, 1.11 mol) and 3-aminopropyl triethoxysilane (491 g, 2.22 mol) were added to 500 mL of toluene in a 1 L autoclave and allowed to react at 120° C. for 4 hr using a Dean-Stark apparatus. Unreacted compounds were removed, after which 650 g of modified polyisobutylene (yield: 88.3%) was obtained. The modified polyisobutylene polymer thus obtained was determined to have a number average molecular weight of 633 g/mol, a weight average molecular weight of 837 g/mol, and a polydispersity of 1.3. The Tg thereof was measured to be −75° C. using DSC, the Brookfield viscosity thereof was 7 cP at 150° C., and the Si content thereof was measured to be 2.2 mass % using XRF.

[Preparation Example 2] Preparation of HRPB550 Modified Polyisobutylene Polymer

Polyisobutylene (Mn: 595 g/mol, PD=1.4, α-vinylidene: 81.0 mol % based on $^{13}$C-NMR, viscosity: 30.1 cSt at 100° C., 300 g, 0.5 mol) and maleic anhydride (60.0 g, 0.6 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-2). The conversion rate thereof was determined to be 84.4% through column chromatography.

Then, the PIBSA-2 thus prepared (300 g, 0.46 mol) and 3-aminopropyl triethoxysilane (214 g, 0.97 mol) were added to 200 mL of toluene in a 1 L autoclave and allowed to react at 120° C. for 4 hr using a Dean-Stark apparatus. Unreacted compounds were removed, after which 340 g of modified polyisobutylene (yield: 93%) was obtained.

The modified polyisobutylene polymer thus obtained was determined to have a number average molecular weight of 819 g/mol, a weight average molecular weight of 1,448 g/mol, and a polydispersity of 1.8. The Tg thereof was measured to be −72° C. using DSC, the Brookfield viscosity thereof was 85 cP at 150° C., and the Si content thereof was measured to be 1.8 mass % using XRF.

[Preparation Example 3] Preparation of HRPB750 Modified Polyisobutylene Polymer

Polyisobutylene (Mn: 742 g/mol, PD=1.3, α-vinylidene: 87.0 mol % based on $^{13}$C-NMR, viscosity: 86 cSt at 100° C., 500 g, 0.67 mol) and maleic anhydride (72 g, 0.74 mol) were placed in a 1 L autoclave and allowed to react at 200° C. for 12 hr using a mechanical stirrer. In order to remove unreacted maleic anhydride, nitrogen bubbling was performed for 2 hr, thus obtaining polyisobutylene succinic anhydride (PIBSA-3). The conversion rate thereof was determined to be 84.4% through column chromatography.

Then, the PIBSA-3 thus prepared (500 g, 0.60 mol) and 3-aminopropyl triethoxysilane (268 g, 1.21 mol) were added to 500 mL of toluene in a 1 L autoclave and allowed to react at 120° C. for 4 hr using a Dean-Stark apparatus. Unreacted compounds were removed, after which 560 g of modified polyisobutylene (yield: 96%) was obtained.

The modified polyisobutylene polymer thus obtained was determined to have a number average molecular weight of 1,088 g/mol, a weight average molecular weight of 2,103 g/mol, and a polydispersity of 1.9. The Tg thereof was measured to be −70° C. using DSC, the Brookfield viscosity thereof was 106 cP at 150° C., and the Si content thereof was measured to be 1.5 mass % using XRF.

[Preparation Example 4] Preparation of HRPB1000 Modified Polyisobutylene Polymer Polyisobutylene (Mn: 992 g/mol, PD=1.4, α-vinylidene: 88.3 mol % based on $^{13}$C-NMR, viscosity: 193 cSt at 100° C., 500 g, 0.5 mol) and maleic anhydride (52 g, 0.5 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-4). The conversion rate thereof was determined to be 78.4% through column chromatography.

Then, the PIBSA-4 thus prepared (500 g, 0.45 mol) and 3-aminopropyl triethoxysilane (211 g, 0.95 mol) were added to 500 mL of toluene in a 1 L autoclave and allowed to react at 120° C. for 4 hr using a Dean-Stark apparatus. Unreacted compounds were removed, after which 550 g of modified polyisobutylene (yield: 96%) was obtained.

The modified polyisobutylene polymer thus obtained was determined to have a number average molecular weight of 1,266 g/mol, a weight average molecular weight of 2,174 g/mol, and a polydispersity of 1.7. The Tg thereof was measured to be −69° C. using DSC, the Brookfield viscosity thereof was 250 cP at 150° C., and the Si content thereof was measured to be 1.3 mass % using XRF.

[Preparation Example 5] Preparation of HRPB1300 Modified Polyisobutylene Polymer Polyisobutylene (Mn: 1,312 g/mol, PD=1.6, α-vinylidene: 89.6 mol based on $^{13}$C-NMR, viscosity: 431 cSt at 100° C., 500 g, 0.38 mol) and maleic anhydride (45 g, 0.46 mol) were placed in a 1 L autoclave and allowed to react at 200° C. for 12 hr using a mechanical stirrer. In order to remove unreacted maleic anhydride, nitrogen bubbling was performed for 2 hr, thus obtaining polyisobutylene succinic anhydride (PIBSA-5). The conversion rate thereof was determined to be 86.7% through column chromatography.

Then, the PIBSA-5 thus prepared (500 g, 0.35 mol) and 3-aminopropyl triethoxysilane (156 g, 0.71 mol) were added to 500 mL of toluene in a 1 L autoclave and allowed to react at 120° C. for 4 hr using a Dean-Stark apparatus. Unreacted compounds were removed, after which 550 g of modified polyisobutylene (yield: 95.4%) was obtained.

The modified polyisobutylene polymer thus obtained was determined to have a number average molecular weight of 1,929 g/mol, a weight average molecular weight of 3,452 g/mol, and a polydispersity of 1.8. The Tg thereof was measured to be −69° C. using DSC, the Brookfield viscosity thereof was 375 cP at 150° C., and the Si content thereof was measured to be 1.1 mass % using XRF.

[Preparation Example 6] Preparation of HRPB1800 Modified Polyisobutylene Polymer Polyisobutylene (Mn: 1,792 g/mol, PD=1.5, α-vinylidene: 87.5 mol % based on $^{13}$C-NMR, viscosity: 1,279 cSt at 100° C., 500 g, 0.28 mol) and maleic anhydride (29 g, 0.3 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-6). The conversion rate thereof was determined to be 76.4% through column chromatography.

Then, the PIBSA-6 thus prepared (500 g, 0.26 mol) and 3-aminopropyl triethoxysilane (123 g, 0.56 mol) were added to 500 mL of toluene in a 1 L autoclave and allowed to react at 120° C. for 4 hr using a Dean-Stark apparatus. Unreacted compounds were removed, after which 510 g of modified polyisobutylene (yield: 92.4%) was obtained.

The modified polyisobutylene polymer thus obtained was determined to have a number average molecular weight of 1,950 g/mol, a weight average molecular weight of 4,700 g/mol, and a polydispersity of 2.4. The Tg thereof was measured to be −70° C. using DSC, the Brookfield viscosity thereof was 776 cP at 150° C., and the Si content thereof was measured to be 0.9 mass % using XRF.

[Preparation Example 7] Preparation of HRPB2000 Modified Polybutene Polymer

Polyisobutylene (Mn: 1,980 g/mol, PD=1.6, α-vinylidene: 81.4 mol % based on $^{13}$C-NMR, viscosity: 1400 cSt at 100° C., 500 g, 0.25 mol) and maleic anhydride (28 g, 0.29 mol) were placed in a 1 L autoclave and allowed to react at 200° C. for 12 hr using a mechanical stirrer. In order to remove unreacted maleic anhydride, nitrogen bubbling was performed for 2 hr, thus obtaining polyisobutylene succinic anhydride (PIBSA-7). The conversion rate thereof was determined to be 76.8% through column chromatography.

Then, the PIBSA-7 thus prepared (500 g, 0.25 mol) and 3-aminopropyl triethoxysilane (110 g, 0.50 mol) were added to 500 mL of toluene in a 1 L autoclave and allowed to react at 120° C. for 4 hr using a Dean-Stark apparatus. Unreacted compounds were removed, after which 540 g of modified polybutene (yield: 93%) was obtained.

The modified polybutene polymer thus obtained was determined to have a number average molecular weight of 2,209 g/mol, a weight average molecular weight of 5,219 g/mol, and a polydispersity of 2.4. The Tg thereof was measured to be −68° C. using DSC, the Brookfield viscosity thereof was 882 cP at 150° C., and the Si content thereof was measured to be 0.8 mass % using XRF.

[Preparation Example 8] Preparation of HRPB2300 Modified Polyisobutylene Polymer Polyisobutylene (Mn: 2,264 g/mol, PD=1.7, α-vinylidene: 85.7 mol % based on $^{13}$C-NMR, viscosity: 1,477 cSt at 100° C., 500 g, 0.22 mol) and maleic anhydride (23.0 g, 0.23 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-8). The conversion rate thereof was determined to be 77.4% through column chromatography.

Then, the PIBSA-8 thus prepared (300 g, 0.13 mol) and 3-aminopropyl triethoxysilane (61 g, 0.27 mol) were added to 200 mL of toluene in a 1 L autoclave and allowed to react at 120° C. for 4 hr using a Dean-Stark apparatus. Unreacted compounds were removed, after which 280 g of modified polyisobutylene (yield: 91.3%) was obtained.

The modified polyisobutylene polymer thus obtained was determined to have a number average molecular weight of 2,350 g/mol, a weight average molecular weight of 5,632 g/mol, and a polydispersity of 2.4. The Brookfield viscosity thereof was 900 cP at 150° C., the Tg thereof was measured to be −68° C. using DSC, and the Si content thereof was measured to be 0.7 mass % using XRF.

[Preparation Example 9] Preparation of HRPB3000 Modified Polyisobutylene Polymer Polyisobutylene (Mn: 3,213 g/mol, PD=1.7, α-vinylidene: 85.2 mol % based on $^{13}$C-NMR, viscosity: 3,200 cSt at 100° C., 500 g, 0.16 mol) and maleic anhydride (20.0 g, 0.20 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-9). The conversion rate thereof was determined to be 77.4% through column chromatography.

Then, the PIBSA-9 thus prepared (300 g, 0.09 mol) and 3-aminopropyl triethoxysilane (40 g, 0.18 mol) were added to 200 mL of toluene in a 1 L autoclave and allowed to react at 120° C. for 4 hr using a Dean-Stark apparatus. Unreacted compounds were removed, after which 290 g of modified polyisobutylene (yield: 88.1%) was obtained.

The modified polyisobutylene polymer thus obtained was determined to have a number average molecular weight of 3,862 g/mol, a weight average molecular weight of 9,948 g/mol, and a polydispersity of 2.6. The Brookfield viscosity thereof was 4,600 cP at 150° C., the Tg thereof was measured to be −65° C. using DSC, and the Si content thereof was measured to be 0.1 mass % using XRF.

[Preparation Example 10] Preparation of HRPB5000 Modified Polyisobutylene Polymer Polyisobutylene (Mn: 5,897 g/mol, PD=1.8, α-vinylidene: 87.0 mol % based on $^{13}$C-NMR, viscosity: 11,322 cSt at 100° C., 500 g, 0.1 mol) and maleic anhydride (10.0 g, 0.1 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-10). The conversion rate thereof was determined to be 70.4% through column chromatography.

Then, the PIBSA-10 thus prepared (300 g, 0.05 mol) and 3-aminopropyl triethoxysilane (25 g, 0.1 mol) were added to 200 mL of toluene in a 1 L autoclave and allowed to react at 120° C. for 4 hr using a Dean-Stark apparatus. Unreacted compounds were removed, after which 250 g of modified polyisobutylene (yield: 80.7%) was obtained.

The modified polyisobutylene polymer thus obtained was determined to have a number average molecular weight of 6,187 g/mol, a weight average molecular weight of 19,750 g/mol, and a polydispersity of 3.2. The Brookfield viscosity thereof was 9,100 cP at 150° C., the Tg thereof was measured to be −60° C. using DSC, and the Si content thereof was measured to be 0.05 mass % using XRF.

[Preparation Example 11] Preparation of HRPB260 Modified Polyisobutylene Polymer Polyisobutylene (Mn: 260 g/mol, PD=1.2, α-vinylidene: 78.4 mol % based on $^{13}$C-NMR, viscosity: 5 cSt at 40° C., 500 g, 1.92 mol) and maleic anhydride (192 g, 1.96 mol) were placed in a 1 L autoclave and allowed to react at 200° C. for 12 hr using a mechanical stirrer. In order to remove unreacted maleic anhydride, nitrogen bubbling was performed for 2 hr, thus obtaining polyisobutylene succinic anhydride (PIBSA-11). The conversion rate thereof was determined to be 76.1% through column chromatography.

Then, the PIBSA-11 thus prepared (500 g, 1.39 mol) and 3-aminopropyl triethoxysilane (690 g, 3.12 mol) were added to 500 mL of toluene in a 1 L autoclave and allowed to react at 120° C. for 4 hr using a Dean-Stark apparatus. Unreacted compounds were removed, after which 700 g of modified polyisobutylene (yield: 92%) was obtained.

The modified polyisobutylene polymer thus obtained was determined to have a number average molecular weight of 543 g/mol, a weight average molecular weight of 751 g/mol, and a polydispersity of 1.4. The Tg thereof was measured to be −75° C. using DSC, the Brookfield viscosity thereof was 4 cP at 150° C., and the Si content thereof was measured to be 2.3 mass % using XRF.

[Preparation Example 12] Preparation of HRPB7000 Modified Polyisobutylene Polymer Polyisobutylene (Mn: 7,096 g/mol, PD=2.5, α-vinylidene: 80.4 mol % based on $^{13}$C-NMR, viscosity: 24,734 cSt at 100° C., 500 g, 0.07 mol) and maleic anhydride (10.0 g, 0.1 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-12). The conversion rate thereof was determined to be 75.1% through column chromatography.

Then, the PIBSA-12 thus prepared (300 g, 0.04 mol) and 3-aminopropyl triethoxysilane (18 g, 0.08 mol) were added to 200 mL of toluene in a 1 L autoclave and allowed to react at 120° C. for 4 hr using a Dean-Stark apparatus. Unreacted compounds were removed, after which 250 g of modified polyisobutylene (yield: 80.7%) was obtained.

The modified polyisobutylene polymer thus obtained was determined to have a number average molecular weight of 7,641 g/mol, a weight average molecular weight of 22,812 g/mol, and a polydispersity of 3.0. The Brookfield viscosity thereof was 12,000 cP at 150° C., the Tg thereof was measured to be −60° C. using DSC, and the Si content thereof was measured to be 0.05 mass % using XRF.

[Preparation Example 13] Preparation of HRPB1000 Modified Polyisobutylene Polymer Polyisobutylene (Mn: 997 g/mol, PD=1.4, α-vinylidene: 68.3 mol % based on $^{13}$C-NMR, viscosity: 197 cSt at 100° C., 500 g, 0.5 mol) and maleic anhydride (52 g, 0.5 mol) were placed in a 1 L autoclave and allowed to react at 230° C. for 12 hr using a mechanical stirrer. In order to remove unreacted maleic anhydride, nitrogen bubbling was performed for 2 hr, thus obtaining polyisobutylene succinic anhydride (PIBSA-13). The conversion rate thereof was determined to be 73.4% through column chromatography.

Then, the PIBSA-13 thus prepared (500 g, 0.45 mol) and 3-aminopropyl triethoxysilane (211 g, 0.95 mol) were added to 500 mL of toluene in a 1 L autoclave and allowed to react at 120° C. for 4 hr using a Dean-Stark apparatus. Unreacted compounds were removed, after which 481 g of modified polyisobutylene (yield: 84%) was obtained.

The modified polyisobutylene polymer thus obtained was determined to have a number average molecular weight of 1,175 g/mol, a weight average molecular weight of 1,986 g/mol, and a polydispersity of 1.7. The Tg thereof was measured to be −70° C. using DSC, the Brookfield viscosity thereof was 220 cP at 150° C., and the Si content thereof was measured to be 1.2 mass % using XRF.

The properties of the modified polyisobutylene polymers prepared in Preparation Examples 1 to 13 are shown in Table 1 below.

TABLE 1

| | Polyisobutylene | | Modified polyisobutylene polymer | | | | |
| --- | --- | --- | --- | --- | --- | --- | --- |
| | Mn | α-vinylidene (mol %) | Mn | Polydispersity | Viscosity (cP) | Si content (mass %) | Tg (° C.) |
| Preparation Example 1 | 351 | 80.6 | 633 | 1.3 | 7 | 2.2 | −75 |
| Preparation Example 2 | 595 | 81.0 | 819 | 1.8 | 85 | 1.8 | −72 |
| Preparation Example 3 | 742 | 87.0 | 1,088 | 1.9 | 106 | 1.5 | −70 |
| Preparation Example 4 | 992 | 88.3 | 1,266 | 1.7 | 250 | 1.3 | −69 |
| Preparation Example 5 | 1,312 | 89.6 | 1,929 | 1.8 | 375 | 1.1 | −69 |
| Preparation Example 6 | 1,792 | 87.5 | 1,950 | 2.4 | 776 | 0.9 | −70 |
| Preparation Example 7 | 1,980 | 81.4 | 2,209 | 2.4 | 882 | 0.8 | −68 |
| Preparation Example 8 | 2,264 | 85.7 | 2,350 | 2.4 | 900 | 0.7 | −68 |
| Preparation Example 9 | 3,213 | 85.2 | 3,862 | 2.6 | 4,600 | 0.1 | −65 |
| Preparation Example 10 | 5,897 | 87.0 | 6,187 | 3.2 | 9,100 | 0.05 | −60 |

TABLE 1-continued

|  | Polyisobutylene | | Modified polyisobutylene polymer | | | | |
| --- | --- | --- | --- | --- | --- | --- | --- |
|  | Mn | α-vinylidene (mol %) | Mn | Polydispersity | Viscosity (cP) | Si content (mass %) | Tg (° C.) |
| Preparation Example 11 | 260 | 78.4 | 543 | 1.4 | 4 | 2.3 | −75 |
| Preparation Example 12 | 7,096 | 80.4 | 7,641 | 3.0 | 12,000 | 0.05 | −60 |
| Preparation Example 13 | 997 | 68.3 | 1,175 | 1.7 | 220 | 1.2 | −70 |

Preparation of Rubber Composition (Examples 1 to 10 and Comparative Examples 1 to 5)

Example 1

A rubber base including 48.1 parts by weight of styrene butadiene rubber 1 (styrene: 25%, vinyl: 63%, TDAE: 37.5 phr, SBR1), 45 parts by weight of styrene butadiene rubber 2 (styrene: 10%, vinyl: 39%, SBR2), and 20 parts by weight of butadiene rubber (KBR-01, Kumho Petrochemical, BR) was prepared, and, based on 100 parts by weight of the rubber base, 5 parts by weight of carbon black, 70 parts by weight of silica (US7000GR, Evonik, CTAB 165 m²/g), 5.6 parts by weight of Si-69 as a silane-coupling agent, 3.0 parts by weight of zinc oxide, 2.0 parts by weight of stearic acid, 1.6 parts by weight of sulfur as a vulcanizing agent (Miwon Chemical), 1.6 parts by weight of CBS (N-cyclohexyl-2-benzothiazylsulfenamide) as a vulcanization accelerator, 2 parts by weight of DPG (1,3-diphenylguanidine) as a vulcanization accelerator, and 6.875 parts by weight of the modified polyisobutylene prepared in Preparation Example 1 were mixed using an internal Banbury mixer to afford a masterbatch, after which mixed rubber was manufactured using an open twin-screw roll mill, followed by vulcanization at 165° C. for 10 min, thereby manufacturing rubber. The components and amounts of the rubber composition are shown in Table 2 below.

Example 2

Rubber was manufactured in the same manner as in Example 1, with the exception that the modified polyisobutylene polymer prepared in Preparation Example 2 was used in lieu of the modified polyisobutylene polymer prepared in Preparation Example 1.

Example 3

Rubber was manufactured in the same manner as in Example 1, with the exception that the modified polyisobutylene polymer prepared in Preparation Example 3 was used in lieu of the modified polyisobutylene polymer prepared in Preparation Example 1.

Example 4

Rubber was manufactured in the same manner as in Example 1, with the exception that the modified polyisobutylene polymer prepared in Preparation Example 4 was used in lieu of the modified polyisobutylene polymer prepared in Preparation Example 1.

Example 5

Rubber was manufactured in the same manner as in Example 1, with the exception that the modified polyisobutylene polymer prepared in Preparation Example 5 was used in lieu of the modified polyisobutylene polymer prepared in Preparation Example 1.

Example 6

Rubber was manufactured in the same manner as in Example 1, with the exception that the modified polyisobutylene polymer prepared in Preparation Example 6 was used in lieu of the modified polyisobutylene polymer prepared in Preparation Example 1.

Example 7

Rubber was manufactured in the same manner as in Example 1, with the exception that the modified polyisobutylene polymer prepared in Preparation Example 7 was used in lieu of the modified polyisobutylene polymer prepared in Preparation Example 1.

Example 8

Rubber was manufactured in the same manner as in Example 1, with the exception that the modified polyisobutylene polymer prepared in Preparation Example 8 was used in lieu of the modified polyisobutylene polymer prepared in Preparation Example 1.

Example 9

Rubber was manufactured in the same manner as in Example 1, with the exception that the modified polyisobutylene polymer prepared in Preparation Example 9 was used in lieu of the modified polyisobutylene polymer prepared in Preparation Example 1.

Example 10

Rubber was manufactured in the same manner as in Example 1, with the exception that the modified polyisobutylene polymer prepared in Preparation Example 10 was used in lieu of the modified polyisobutylene polymer prepared in Preparation Example 1.

Comparative Example 1

Rubber was manufactured in the same manner as in Example 1, with the exception that a rubber composition was prepared by mixing 6.875 parts by weight of rubber-compounding oil (TDAE), rather than the polymer of Preparation Example 1.

Comparative Example 2

Rubber was manufactured in the same manner as in Example 1, with the exception that a rubber composition was prepared by mixing 6.875 parts by weight of commercially available terpene resin (terpene phenol resin, Yasuhara Chemical T160), rather than the polymer of Preparation Example 1.

Comparative Example 3

Rubber was manufactured in the same manner as in Example 1, with the exception that a rubber composition was prepared by mixing the modified polyisobutylene polymer prepared in Preparation Example 11, rather than the polymer of Preparation Example 1.

Comparative Example 4

Rubber was manufactured in the same manner as in Example 1, with the exception that a rubber composition was prepared by mixing the modified polyisobutylene polymer prepared in Preparation Example 12, rather than the polymer of Preparation Example 1.

Comparative Example 5

Rubber was manufactured in the same manner as in Example 1, with the exception that a rubber composition was prepared by mixing the modified polyisobutylene polymer prepared in Preparation Example 13, rather than the polymer of Preparation Example 1.

The specific components and amounts of the rubber compositions are shown in Tables 2 and 3 below.

TABLE 2

| Classification (phr) | | | Example 1 | Example 2 | Example 3 | Example 4 | Example 5 | Example 6 |
|---|---|---|---|---|---|---|---|---|
| Polymer | | SBR1 | 48.1 | Same as value on left | Same as value on left | Same as value on left | Same as value on left | Same as value on left |
| | | SBR2 | 45 | Same as value on left | Same as value on left | Same as value on left | Same as value on left | Same as value on left |
| | | BR | 20 | Same as value on left | Same as value on left | Same as value on left | Same as value on left | Same as value on left |
| Filler | | Silica | 70 | Same as value on left | Same as value on left | Same as value on left | Same as value on left | Same as value on left |
| | | Carbon black | 5 | Same as value on left | Same as value on left | Same as value on left | Same as value on left | Same as value on left |
| | | Silane (Si-69) | 5.6 | Same as value on left | Same as value on left | Same as value on left | Same as value on left | Same as value on left |
| | | Preparation Example 1 | 6.875 | — | — | — | — | — |
| | | Preparation Example 2 | — | 6.875 | — | — | — | — |
| | | Preparation Example 3 | — | — | 6.875 | — | — | — |
| | | Preparation Example 4 | — | — | — | 6.875 | — | — |
| | | Preparation Example 5 | — | — | — | — | 6.875 | — |
| | | Preparation Example 6 | — | — | — | — | — | 6.875 |
| | | Preparation Example 7 | — | — | — | — | — | — |
| | | Preparation Example 8 | — | — | — | — | — | — |
| | | Preparation Example 9 | — | — | — | — | — | — |
| | | Preparation Example 10 | — | — | — | — | — | — |
| | | Zinc oxide | 3 | Same as value on left | Same as value on left | Same as value on left | Same as value on left | Same as value on left |
| | | Stearic acid | 2 | Same as value on left | Same as value on left | Same as value on left | Same as value on left | Same as value on left |
| Final MB | | Sulfur | 1.6 | Same as value on left | Same as value on left | Same as value on left | Same as value on left | Same as value on left |
| | | CBS | 1.6 | Same as value on left | Same as value on left | Same as value on left | Same as value on left | Same as value on left |
| | | DPG | 2 | Same as value on left | Same as value on left | Same as value on left | Same as value on left | Same as value on left |

| Classification (phr) | | | Example 7 | Example 8 | Example 9 | Example 10 |
|---|---|---|---|---|---|---|
| Polymer | | SBR1 | Same as value on left | Same as value on left | Same as value on left | Same as value on left |
| | | SBR2 | Same as value on left | Same as value on left | Same as value on left | Same as value on left |
| | | BR | Same as value on left | Same as value on left | Same as value on left | Same as value on left |
| Filler | | Silica | Same as value on left | Same as value on left | Same as value on left | Same as value on left |
| | | Carbon black | Same as value on left | Same as value on left | Same as value on left | Same as value on left |
| | | Silane (Si-69) | Same as value on left | Same as value on left | Same as value on left | Same as value on left |
| | | Preparation Example 1 | — | — | — | — |

TABLE 2-continued

|  |  |  |  |  |  |
|---|---|---|---|---|---|
|  | Preparation Example 2 | — | — | — | — |
|  | Preparation Example 3 | — | — | — | — |
|  | Preparation Example 4 | — | — | — | — |
|  | Preparation Example 5 | — | — | — | — |
|  | Preparation Example 6 | — | — | — | — |
|  | Preparation Example 7 | 6.875 | — | — | — |
|  | Preparation Example 8 | — | 6.87.5 | — | — |
|  | Preparation Example 9 | — | — | 6.875 | — |
|  | Preparation Example 10 | — | — | — | 6.875 |
| Final MB | Zinc oxide | Same as value on left | Same as value on left | Same as value on left | Same as value on left |
|  | Stearic acid | Same as value on left | Same as value on left | Same as value on left | Same as value on left |
|  | Sulfur | Same as value on left | Same as value on left | Same as value on left | Same as value on left |
|  | CBS | Same as value on left | Same as value on left | Same as value on left | Same as value on left |
|  | DPG | Same as value on left | Same as value on left | Same as value on left | Same as value on left |

TABLE 3

| | Classification (phr) | Comparative Example 1 | Comparative Example 2 | Comparative Example 3 | Comparative Example 4 | Comparative Example 5 |
|---|---|---|---|---|---|---|
| Polymer | SBR1 | 48.1 | Same as value on left | Same as value on left | Same as value on left | Same as value on left |
|  | SBR2 | 45 | Same as value on left | Same as value on left | Same as value on left | Same as value on left |
|  | BR | 20 | Same as value on left | Same as value on left | Same as value on left | Same as value on left |
| Filler | Silica | 70 | Same as value on left | Same as value on left | Same as value on left | Same as value on left |
|  | Carbon black | 5 | Same as value on left | Same as value on left | Same as value on left | Same as value on left |
|  | Silane (Si-69) | 5.6 | Same as value on left | Same as value on left | Same as value on left | Same as value on left |
| Oil & Chemical | Oil (TDAE) | 6.875 | — | — | — | — |
|  | Terpene resin | — | 6.875 | — | — | — |
|  | Preparation Example 11 | — | — | 6.875 | — | — |
|  | Preparation Example 12 | — | — | — | 6.875 | — |
|  | Preparation Example 13 | — | — | — | — | 6.875 |
|  | Zinc oxide | 3 | Same as value on left | Same as value on left | Same as value on left | Same as value on left |
|  | Stearic acid | 2 | Same as value on left | Same as value on left | Same as value on left | Same as value on left |
| Final MB | Sulfur | 1.6 | Same as value on left | Same as value on left | Same as value on left | Same as value on left |
|  | CBS | 1.6 | Same as value on left | Same as value on left | Same as value on left | Same as value on left |
|  | PPG | 2 | Same as value on left | Same as value on left | Same as value on left | Same as value on left |

The properties of the prepared rubber compositions were measured through the following methods. Considering that some properties of the rubber composition may vary depending on the surrounding environmental conditions, results obtained under the same conditions on the same day are shown in Tables 4 and below.

Evaluation of Payne Effect

The Payne effect is associated with storage modulus values measured at elongations of 0.02% and 20%, and the smaller the change, the better the dispersion of silica, whereby superior rolling resistance can be obtained and thus the general properties of the rubber can be improved. For the rubber manufactured in Examples and Comparative Examples, the Payne effect value was measured in a 0.02-20% strain sweep at a rate of 1 Hz at 60° C. using a sample having a weight of 7 g or more and an RPA 2000 from ALPHA Technologies, and the difference in storage modulus values ($\Delta G'=G'_{20\%}-G'_{0.02\%}$) measured at elongations of 0.02% and 20% was determined, and the results thereof are shown in Tables 4 and 5 below.

Measurement of Grip Performance and Rolling Resistance Through Dynamic Loss Coefficient The tan δ value at 0° C. corresponds to grip force, and the higher this value, the better the grip force, whereas the tan δ value at 60° C. corresponds to rolling resistance, and the lower this value, the better the rolling resistance [M. J. Wang, Rubber. Chem. Technol., 71, 520 (1998)]. For the rubber manufactured in Examples and Comparative Examples, the dynamic loss coefficient at 0° C. and 60° C. using DMTS (dynamic mechanical thermal spectrometry; GABO, EPLEXOR 500N) and the glass transition temperature (Tg) were measured, and the results thereof are shown in Tables 4 and 5 below. Here, the measurement conditions were as follows: frequency: 10 Hz, strain (static strain: 3%, dynamic strain: 0.25%), and temperature: −60 to 70° C.

carbon black and silica, Examples 1 to 10 using the modified polyisobutylene polymer synthesized from polyisobutylene having a number average molecular weight satisfying the range of 350 g/mol to 6,000 g/mol and including 80 mol % or more of α-vinylidene exhibited ΔG' of 2.4 or less, and the ΔG' value of Examples 2 to 9 using polyisobutylene having a molecular weight ranging from 600 g/mol to 3,200 g/mol was 2.1 or less, which is evaluated to be better.

On the other hand, in Comparative Examples 1 to 5 using the rubber-compounding oil, terpene resin or the modified polyisobutylene polymer synthesized from polyisobutylene having a number average molecular weight falling out of the range of 350 g/mol to 6,000 g/mol or having an α-vinylidene content of less than 80 mol %, high ΔG' of 2.5 or more was manifested, indicating that the filler was not dispersed well. Therefore, it was confirmed that the use of the modified polyisobutylene polymer according to Examples of the present invention was capable of significantly improving the dispersibility of silica and carbon black.

In Examples 1 to 10, tan δ at 0° C., which indicates superior braking performance with an increase in the numerical value thereof, was 0.255 or more, and tan δ at 60° C., which indicates superior rolling resistance performance with a decrease in the numerical value thereof, was 0.094 or less, based on which it was confirmed that both braking performance and rolling resistance performance were improved compared to Comparative Examples.

In particular, in Examples 3 to 8, the modified polyisobutylene polymer having a number average molecular weight of 900 to 3,000 g/mol was prepared from polyisobutylene having a number average molecular weight of 700 to 3,000 g/mol, and was added to the rubber composition, whereby tan δ at 0° C. was 0.2707 or more and tan δ at 60° C. was 0.0870 or less, based on which it was

TABLE 4

| Classification (phr) | | Comparative Example 1 | Comparative Example 2 | Comparative Example 3 | Comparative Example 4 | Comparative Example 5 |
|---|---|---|---|---|---|---|
| Payne Effect | ΔG' Unvulcanized | 3.3 | 2.9 | 2.5 | 2.8 | 3.8 |
| DMA | Tg | −30.1 | −26.0 | −30.5 | −27.4 | −29.2 |
| | Tanδ@0° C. | 0.2465 | 0.2989 | 0.2507 | 0.2728 | 0.2656 |
| | Tanδ@60° C. | 0.0940 | 0.1030 | 0.0955 | 0.0990 | 0.0971 |

TABLE 5

| Classification (phr) | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Payne Effect | ΔG' unvulcanized | 2.3 | 2.0 | 2.1 | 2.1 | 2.0 | 2.1 | 1.9 | 1.8 | 2.1 | 2.4 |
| DMA | Tg | −29.8 | −29.6 | −29.1 | −28.9 | −29.1 | −28.7 | −29.3 | −29.7 | −28.7 | −28 |
| | Tanδ@0° C. | 0.2557 | 0.2607 | 0.2707 | 0.2748 | 0.2779 | 0.2848 | 0.2879 | 0.2938 | 0.3018 | 0.2908 |
| | Tanδ@60° C. | 0.093 | 0.0896 | 0.0855 | 0.0839 | 0.0827 | 0.0848 | 0.0867 | 0.0870 | 0.0890 | 0.0933 |

Tables 4 and 5 show the results of measurement of the properties of the rubber compositions of Comparative Examples 1 to 5 using the rubber-compounding oil, terpene resin or modified polyisobutylene polymer having a molecular weight falling out of the range proposed by the present inventors, and of Examples 1 to 10 using the modified polyisobutylene polymers having different molecular weights, respectively.

With reference to Tables 4 and 5, in the case of the ΔG' value representing the extent of dispersion of filler, such as confirmed that braking performance and rolling resistance performance were further improved.

Moreover, in Comparative Example 2 using the terpene resin in lieu of the modified polyisobutylene polymer, braking performance was improved but tan δ at 60° C. was increased to 0.1030 and thus rolling resistance performance was deteriorated, compared to Comparative Example 1.

In Comparative Examples 3 to 5 using the modified polyisobutylene polymers (Preparation Examples 11 to 13) prepared from polyisobutylene in which the number average molecular weight fell out of the range of 350 g/mol to 6,000 g/mol or the α-vinylidene content was less than 80 mol %, superior braking performance was obtained, but tan δ at 60° C., which indicates improved fuel efficiency with a decrease in the value thereof, was measured to be 0.094 or more, based on which it was confirmed that the rolling resistance performance was deteriorated compared to Examples, and also that the rolling resistance performance was hardly improved even when compared with Comparative Example 1.

Based on the above results, it can be concluded that, when the modified polyisobutylene polymer according to the present invention is added to the rubber composition, the dispersibility of silica can be increased, thereby improving both braking performance and fuel efficiency performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rubber composition comprising:
a modified polyisobutylene polymer for rubber compounding; a rubber base; and a filler,
wherein the modified polyisobutylene polymer is prepared by
(i) mixing polyisobutylene having isobutylene as a main chain and a α-vinylidene content of 85 to 95 mol % based on $^{13}$C-NMR; and unsaturated dicarboxylic anhydride; and
(ii) mixing an intermediate obtained in step (i) and a silane compound;
wherein the modified polyisobutylene polymer has a number average molecular weight of 1,929 to 3,000 g/mol,
wherein the silica having a specific surface area (CTAB) of 150 m$^2$/g to 180 m$^2$g, and
wherein the rubber composition comprises, based on 100 parts by weight of the rubber base, 50 to 150 parts by weight of silica, 5 to 20 parts by weight of carbon black, 2 to 40 parts by weight of the modified polyisobutylene polymer, and 2 to 15 parts by weight of a silane-coupling agent.

2. The modified polyisobutylene polymer of claim 1, wherein the polyisobutylene having isobutylene as the main chain is in an amount of 20 to 80 wt %, the unsaturated dicarboxylic anhydride is in an amount of 1 to 20 w t%, and the silane compound is in an amount of 1 to 60 wt %.

3. The modified polyisobutylene polymer of claim 1, wherein the polyisobutylene having isobutylene as the main chain has a number average molecular weight of 500 g/mol to 2,500 g/mol.

4. The modified polyisobutylene polymer of claim 1, wherein the polyisobutylene having isobutylene as the main chain has a polydispersity of 1 to 5.

5. The modified polyisobutylene polymer of claim 1, wherein the unsaturated dicarboxylic anhydride is at least one selected from among maleic anhydride, itaconic anhydride, citraconic anhydride, propenyl succinic anhydride and 2-pentendioic anhydride.

6. The modified polyisobutylene polymer of claim 1, wherein the silane compound contains an amino group.

7. The modified polyisobutylene polymer of claim 6, wherein the silane compound is represented by Chemical Formula 1 below:

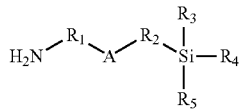

[Chemical Formula 1]

in Chemical Formula 1,
R$_3$ and R$_2$ are each independently selected from among (C1-C5) alkylene, (C1-C5) aminoalkylene, carbonylene and (C1-C5) alkyl carbonylene, and are identical to or different from each other;
R$_3$, R$_4$ and R$_5$ are each independently selected from among hydrogen, hydroxy, (C1-C20) alkyl, (C1-C12) cycloalkyl, (C2-C14) acyloxy, (C4-C20) aryloxy, (C5-C30) araloxy, (C1-C20) amine and (C1-C12) alkoxy, and are identical to or different from each other; and
A is methylene, S$_n$ or ((R$_6$)NR$_7$)$_n$, in which R$_6$ is hydrogen or (C1-C5) alkyl, R$_7$ is (C1-C5) alkylene, and n is an integer of 1 to 10.

8. The modified polyisobutylene polymer of claim 6, wherein the silane compound is at least one selected from among 3-aminopropyl triethoxysilane, 3-aminopropyl trimethoxysilane, N-(2-aminoethyl)-3-aminopropyl triethoxysilane, 3-aminopropyl methyldiethoxysilane, 3-aminopropyl silanetriol, 3-aminopropyl methyldimethoxysilane, 3-(2-aminoethylamino)propyl dimethoxymethylsilane, 3-(2-aminoethylamino)propyl trimethoxysilane, 2-ethanediamine N-(2-aminoethyl)-N'-[3-(trimethoxysily)propyl]-1, 1-[3-(trimethoxysilyl)propyl]urea and 1-[3-(triethoxysilyl) propyl]urea.

9. The modified polyisobutylene polymer of claim 1, wherein the modified polyisobutylene polymer contains nitrogen.

10. The modified polyisobutylene polymer of claim 1, wherein the modified polyisobutylene polymer contains a carbonyl group.

11. The modified polyisobutylene polymer of claim 1, wherein the modified polyisobutylene polymer contains an amide group.

12. The modified polyisobutylene polymer of claim 1, wherein the modified polyisobutylene polymer has a Si content of 0.05 to 10 mass % based on X-ray fluorescence analysis.

13. The modified polyisobutylene polymer of claim 1, wherein the modified polyisobutylene polymer has a glass transition temperature of −50° C. or less.

14. The modified polyisobutylene polymer of claim 1, wherein the modified polyisobutylene polymer has a Brookfield viscosity at 150° C. of 5 to 10,000 cP.

15. The modified polyisobutylene polymer of claim 1, wherein the modified polyisobutylene polymer has a polydispersity of 1 to 5.

16. The rubber composition of claim 1, wherein the rubber base comprises at least one selected from among butadiene rubber, butyl rubber, emulsion-polymerized styrene butadiene rubber (E-SBR), solution-polymerized styrene butadiene rubber (S-SBR), epichlorohydrin rubber, nitrile rubber, hydrogenated nitrile rubber, brominated polyisobutyl isoprene-co-paramethyl styrene (BIMS) rubber, urethane rubber, fluorine rubber, silicone rubber, styrene-ethylene-butadiene-styrene copolymer rubber, ethylene propylene rubber, ethylene-propylene-diene monomer rubber, Hypalon rubber, chloroprene rubber, ethylene vinyl acetate rubber and acrylic rubber.

* * * * *